United States Patent
Kume et al.

(10) Patent No.: US 10,011,195 B2
(45) Date of Patent: Jul. 3, 2018

(54) SEAT SLIDING DEVICE

(71) Applicant: TOYOTA BOSHOKU KABUSHIKI KAISHA, Aichi (JP)

(72) Inventors: Sho Kume, Aichi (JP); Hideki Fujisawa, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/800,617

(22) Filed: Nov. 1, 2017

(65) Prior Publication Data
US 2018/0126875 A1   May 10, 2018

(30) Foreign Application Priority Data
Nov. 10, 2016   (JP) .................................. 2016-219641

(51) Int. Cl.
  *F16M 13/00*  (2006.01)
  *B60N 2/07*   (2006.01)
  *B60N 2/08*   (2006.01)

(52) U.S. Cl.
  CPC ......... *B60N 2/0722* (2013.01); *B60N 2/0715* (2013.01); *B60N 2/08* (2013.01)

(58) Field of Classification Search
  CPC ....... B60N 2/0722; B60N 2/0715; B60N 2/08
  USPC ................. 248/429; 296/65.01, 65.11, 65.13
  See application file for complete search history.

(56) References Cited

U.S. PATENT DOCUMENTS

| | | | | |
|---|---|---|---|---|
| 5,848,775 A * | 12/1998 | Isomura | ................ | B60N 2/067 248/430 |
| 9,145,069 B2 * | 9/2015 | Yamada | ................... | B60N 2/07 |
| 9,156,376 B2 * | 10/2015 | Yamada | ................... | B60N 2/08 |
| 9,227,528 B2 * | 1/2016 | Yamada | ............... | B60N 2/0843 |
| 2018/0001791 A1 * | 1/2018 | Kume | ................. | B60N 2/0722 |
| 2018/0086230 A1 * | 3/2018 | Kume | ................. | B60N 2/0722 |
| 2018/0086231 A1 * | 3/2018 | Kume | ................. | B60N 2/0722 |
| 2018/0086232 A1 * | 3/2018 | Kume | ................. | B60N 2/0722 |

FOREIGN PATENT DOCUMENTS

| | | |
|---|---|---|
| JP | 2003-146118 | 5/2003 |
| JP | 5947642 | 7/2016 |

* cited by examiner

*Primary Examiner* — Todd Michael Epps
(74) *Attorney, Agent, or Firm* — Greenblum & Bernstein, P.L.C.

(57) ABSTRACT

A fixed rail comprises a first rail-surface facing upward and a second rail-surface facing downward. A movable rail is configured to be slidable relative to the fixed rail and to support a seat. At least one first roller is mounted on the movable rail. The at least one first roller is configured to receive a downward load imposed on the movable rail and to roll on the first rail-surface. At least one second roller is mounted on the movable rail and is configured to roll on the second rail-surface. At least one pressing member is configured to elastically deform and to upwardly press the at least one second roller upwardly against the second rail-surface.

8 Claims, 9 Drawing Sheets

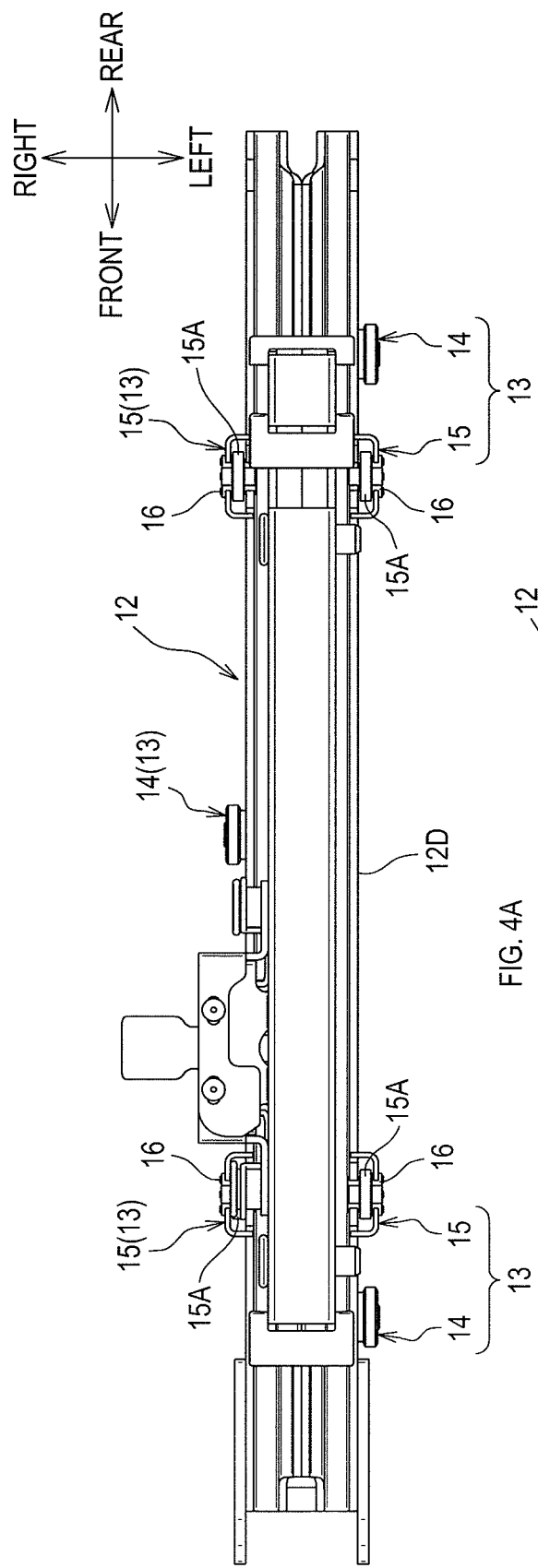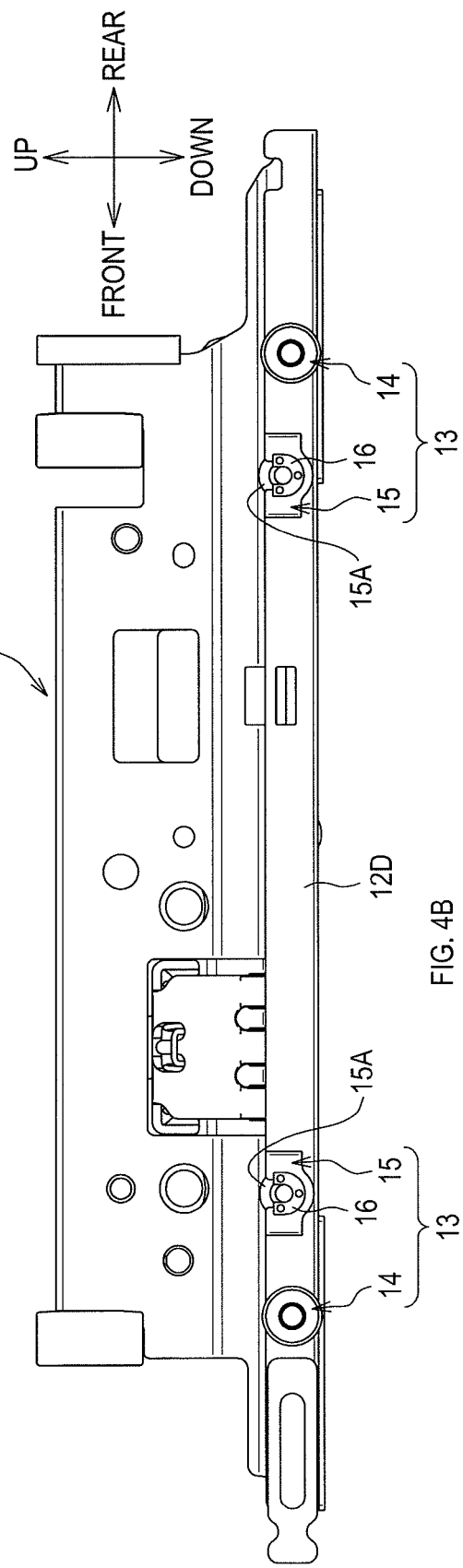
FIG. 4A
FIG. 4B

SEAT SLIDING DEVICE

CROSS-REFERENCE TO RELATED APPLICATIONS

This application claims the benefit of Japanese Patent Application No. 2016-219641 filed Nov. 10, 2016 in the Japan Patent Office, the disclosure of which is incorporated herein by reference.

BACKGROUND

The present disclosure relates to a seat sliding device that supports a seat so that the seat is slidable.

For example, Japanese Patent No. 5947642 discloses a seat sliding device, in which a spherical rolling element, which rolls between a vehicle-side rail and a seat-side member, and an elastic energizing portion, which brings the rolling element to pressure-contact with a rolling surface, are provided for the purpose of inhibiting looseness. The elastic energizing portion is formed by bending a metal-made vertical plate portion configuring the seat-side member.

SUMMARY

The above-mentioned vertical plate portion is formed by plastic working such as press molding and is formed integrally with the seat-side member.

Therefore, according to the invention described in the above patent publication, the pressure-contact force between the rolling element and the rolling surface varies widely due to variation in size at manufacturing, and looseness is unlikely to be inhibited. According to an aspect of the present disclosure, it is preferable that a seat sliding device is provided in consideration of the unlikeliness to inhibit the looseness.

One aspect of the present disclosure is a seat sliding device that comprises a fixed rail, a movable rail, at least one first roller, at least one second roller, and at least one pressing member. The fixed rail comprises a first rail-surface facing upward and a second rail-surface facing downward. The movable rail is configured to be slidable relative to the fixed rail and to support a seat. The at least one first roller is mounted on the movable rail. The at least one first roller is configured to receive a downward load imposed on the movable rail and to roll on the first rail-surface. The at least one second roller is mounted on the movable rail and is configured to roll on the second rail-surface. The at least one pressing member is configured to elastically deform and to upwardly press the at least one second roller upwardly against the second rail-surface.

As described above, according to the present disclosure, the pressing member, which is configured separately from the movable rail and is made of an elastic body, presses the second roller against the second rail-surface. Accordingly, even when there is large variation in dimensions of the movable rail, the variation in dimension can be absorbed by the elastic deformation of the pressing member Further, it is possible to inhibit large variation in a pressure contact force between the second roller and the second rail-surface. As a result, it is possible to inhibit looseness of the seat sliding device. Here, the "elastic deformation" encompasses not only the deformation within the elastic range but also permanent distortion (plastic deformation) occurred when no load is applied to the pressing member.

The present disclosure may be configured as below.

The at least one second roller may comprise an annular-shaped outer ring and a shaft. The outer ring rolls on the second rail-surface. The shaft penetrates the outer ring. The at least one pressing member may apply a pressing force to the shaft while supporting the shaft from both sides. Accordingly, it is possible to suitably support the outer ring.

The at least one second roller may be configured to rotate by an occurrence of sliding contact between the outer ring and the shaft. Accordingly, it is possible to inhibit abrasion of the pressing member and to inhibit the pressing force of the pressing member from lowering.

In order to achieve the above-described configuration, a frictional force occurred at a contact surface between each of the at least one pressing member and the shaft may be greater than a frictional force occurred at the contact surface between the outer ring and the shaft.

The outer ring and the shaft may be made of metal. Accordingly, it is possible to inhibit abrasion of the outer ring.

The at least one pressing member may be provided with a restriction portion. The restriction portion restricts the outer ring from deviating in an axial direction relative to the shaft. Accordingly, it is possible to inhibit occurrences of failures, for example, that the outer ring comes off the shaft.

The at least one pressing member may comprise a first pressing member that transversely restricts the outer ring and is arranged at a first side and a second pressing member that further restricts the outer ring and is arranged at a second side opposed to the first side. The movable rail may comprise at least one first concave portion in which the first pressing member is fitted and at least one second concave portion in which the second pressing member is fitted. Further, the first pressing member may comprise a first approximately U-shaped small concave portion in which a first end of the shaft is fitted. The second pressing member may comprise a second approximately U-shaped small concave portion in which a second end of the shaft is fitted. Accordingly, it is possible to retain the outer ring and support the shaft at both sides by the first concave and the second concave.

The fixed rail may comprise a confronting surface approximately perpendicular to a horizontal direction at a position of the fixed rail facing the first pressing member. The first pressing member may be provided with at least one protrusion protruding toward the confronting surface at the side of the first pressing member facing the confronting surface.

Accordingly, the protrusion abuts on and contact the confronting surface, thereby enabling to inhibit excessive displacement of the movable rail in the width direction. Here, the width direction is a transverse direction extending perpendicularly (left and right) with respect to the longitudinal direction of the movable rail.

BRIEF DESCRIPTION OF THE DRAWINGS

Embodiments of the present disclosure will be described hereinafter by way of example with reference to the accompanying drawings, in which:

FIG. 4A is a top view showing the seat sliding device according to the embodiment;

FIG. 4B is a side view showing the seat sliding device according to the embodiment;

DETAILED DESCRIPTION OF THE PREFERRED EMBODIMENTS

Figure 1:
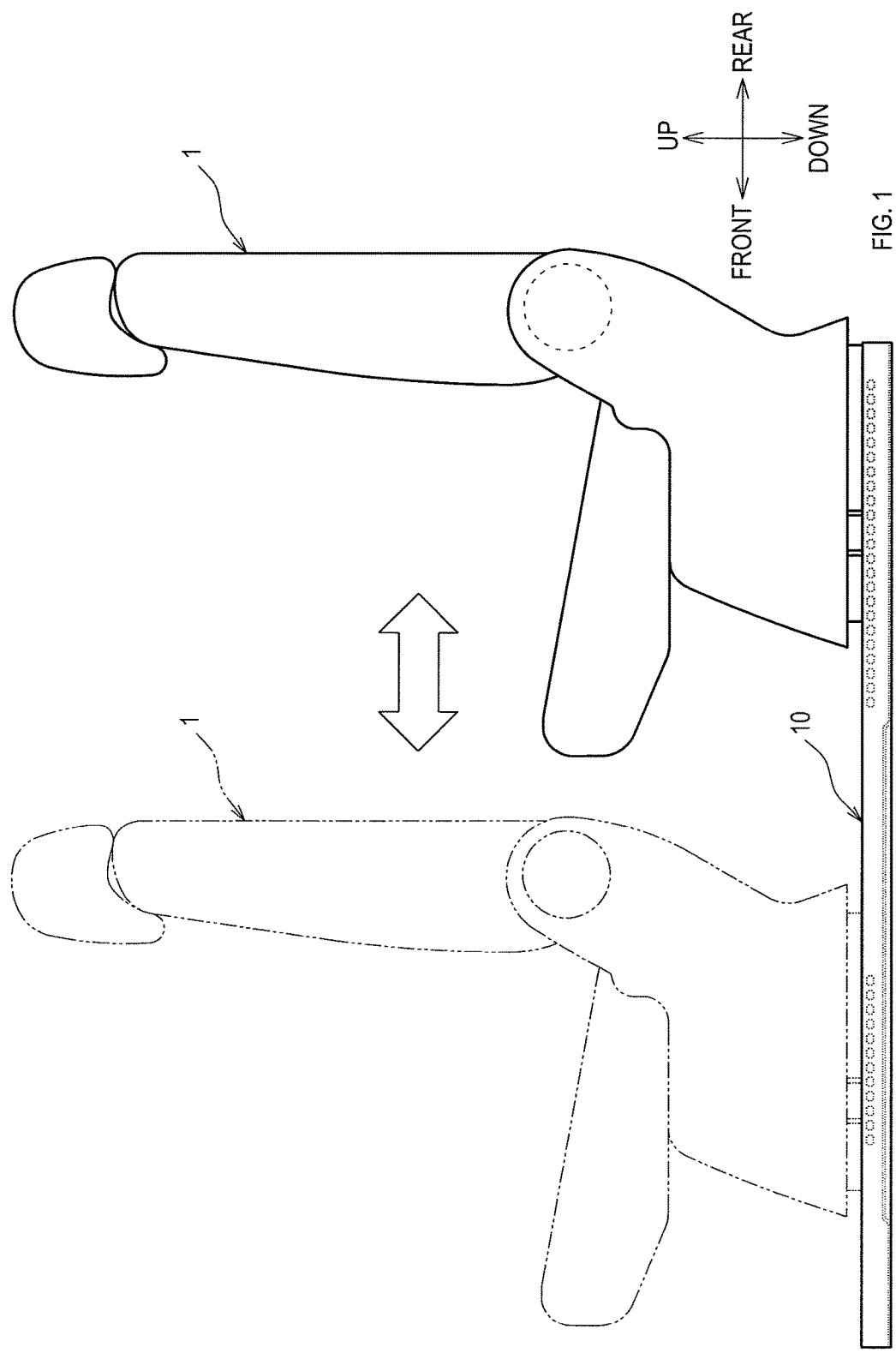
FIG. 1 is a diagram showing an installation of a seat sliding device according to one embodiment of the present disclosure.

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawings are made for easy understanding of relationship between each drawing. Arrows and other marks (directions) labelled on each drawing do not limit the scope of the present disclosure.

At least in respect of a member or portion that is labeled with a reference numeral for explanations, there is at least one in number of such a member or portion unless the number is otherwise specified, for example, as "one of". In other words, there may be two or more of such a member disposed unless the number is otherwise specified.

In the present embodiment, a seat sliding device 10 shown in FIG. 1 will be explained. The seat sliding device 10 enables a vehicle seat 1 to be slidable relative to a vehicle such as an automobile. The seat sliding device 10 can cause the vehicle seat 1 to slide in the front-rear direction (a longitudinal direction) while supporting the vehicle seat 1.

1. Configuration of Seat Sliding Device 1.1 Schematic Configuration

Figure 2:
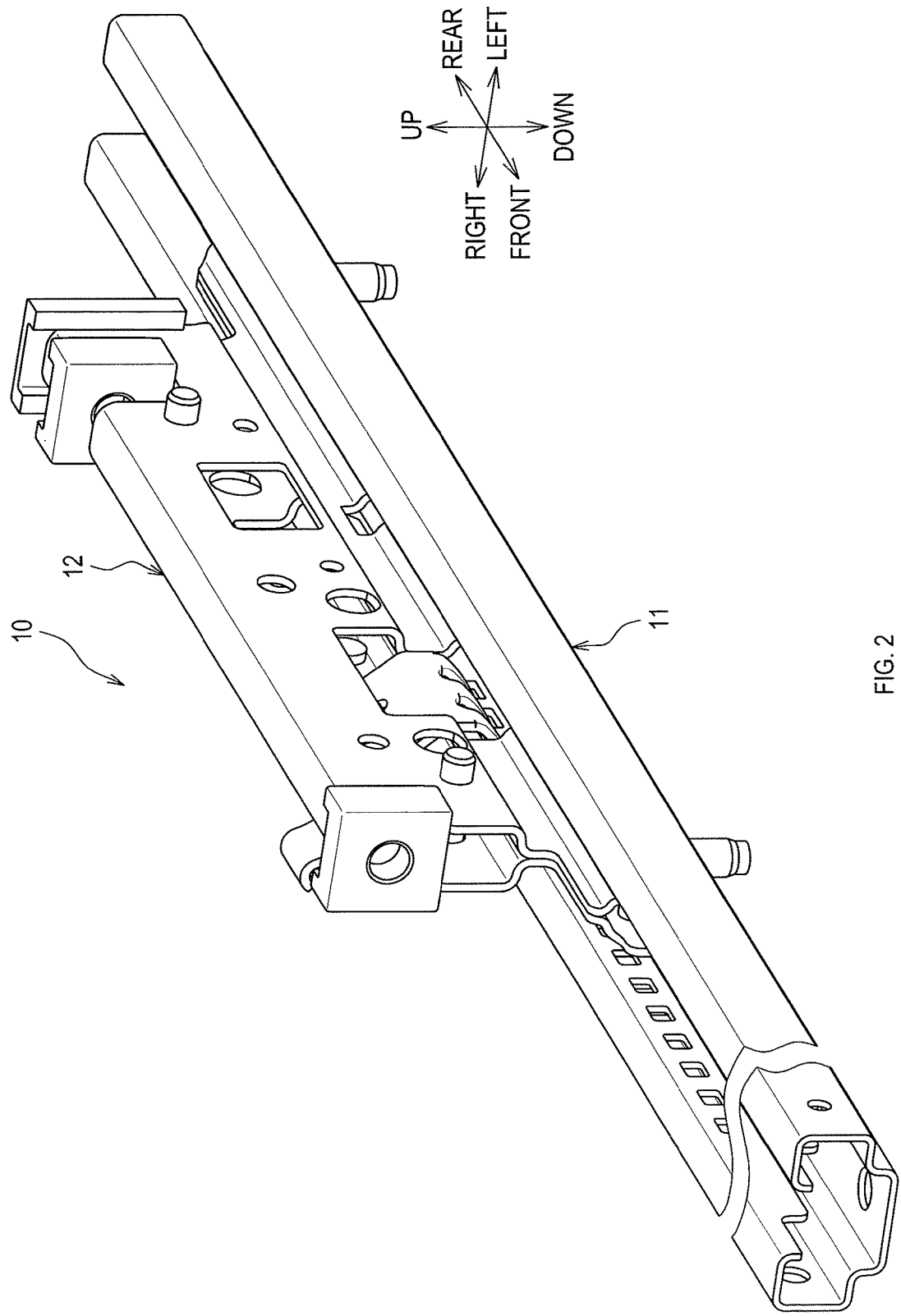
FIG. 2 is a perspective view of the seat sliding device according to the embodiment.

As shown in FIG. 2, the seat sliding device 10 comprises at least a fixed rail 11 and a movable rail 12. The fixed rail 11 is fixed to a vehicle, for example on a floor panel. The fixed rail 11 according to the present embodiment is fixed to the vehicle such that the longitudinal direction of the fixed rail 11 matches the front-rear direction of the vehicle seat 1, and that the fixed rail 11 extends in the front-rear direction of the vehicle.

Figure 5:
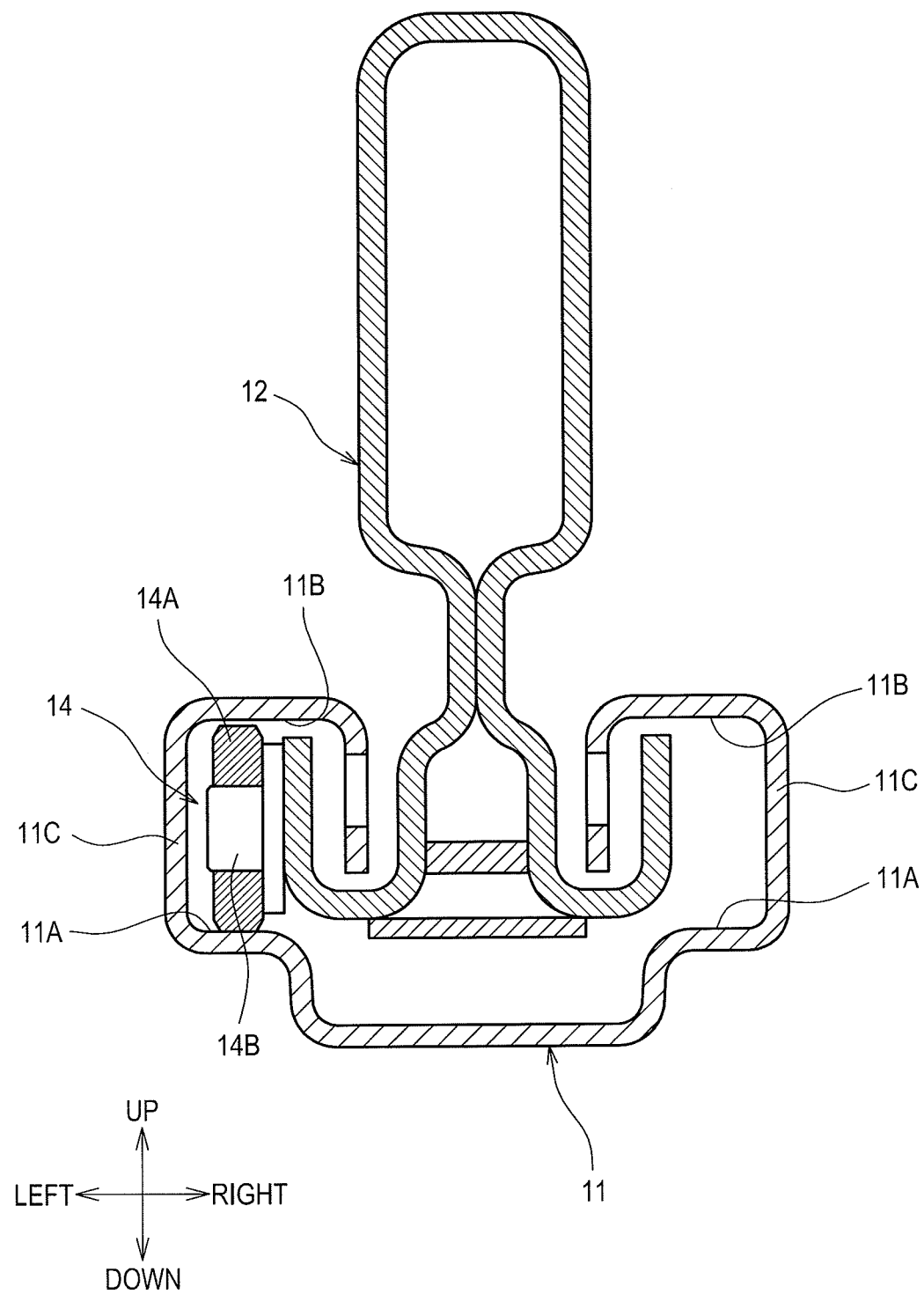
FIG. 5 is a sectional view showing the movable rail according to the embodiment.

As shown in FIG. 5, the fixed rail 11 comprises at least one first rail-surface 11A and at least one second rail-surface 11B. The first rail-surface 11A is a band-plate surface that faces out upward in the vertical direction and extends in a direction parallel to the aforementioned longitudinal direction.

The second rail-surface 11B is a band-plate surface that faces out downward in the vertical direction and extends in a direction parallel to the aforementioned longitudinal direction. In the present embodiment, the first rail-surface 11A and the second rail-surface 11B face each other in the vertical direction across a space.

The first rail-surface 11A and the second rail-surface 11B are coupled via a connecting portion 11C. The connecting portion 11C is a band-plate surface that is approximately orthogonal to the transverse direction and extends in a direction parallel to the aforementioned longitudinal direction. The connecting portion 11C has a confronting surface that is approximately orthogonal to the horizontal direction.

In the fixed rail 11 according to the present embodiment, the first rail-surface 11A, the second rail-surface 11B, and the connecting portion 11C are disposed on each side of the movable rail 12. That is to say that, when viewed down along the vertical direction (a plan view), that is orthogonal to the aforementioned longitudinal direction and the horizontal direction, the first rail-surface 11A, the second rail-surface 11B, and the connecting portion 11C disposed in the left side in FIG. 5 and the first rail-surface 11A, the second rail-surface 11B, and the connecting portion 11C disposed in the right side in FIG. 5 are symmetric about the movable rail 12.

Hereinafter, the direction parallel to the longitudinal direction of the fixed rail 11 is referred to as a "direction of extension". And, the transverse direction that is orthogonal to this direction of extension is referred to as a "width direction". The width direction corresponds to a seat-width direction in the present embodiment.

The movable rail 12 is a moving element that is configured to be slidable relative to the fixed rail 11 in the direction of extension and to support the vehicle seat 1. In other words, the vehicle seat 1 is coupled and fixed to the movable rail 12 and thus is enabled to translate parallel to the direction of extension with the movable rail 12.

The fixed rail 11 and the movable rail 12 are preferably both made of metal. Thus, the first rail-surface 11A, the second rail-surface 11B, and the connecting portion 11C are also preferably made of metal. The first rail-surface 11A, the second rail-surface 11B, and the connecting portion 11C are integrally formed by a plastic working such as press working on a metallic plate.

1.2 Slide-Support Mechanism

Figure 3:
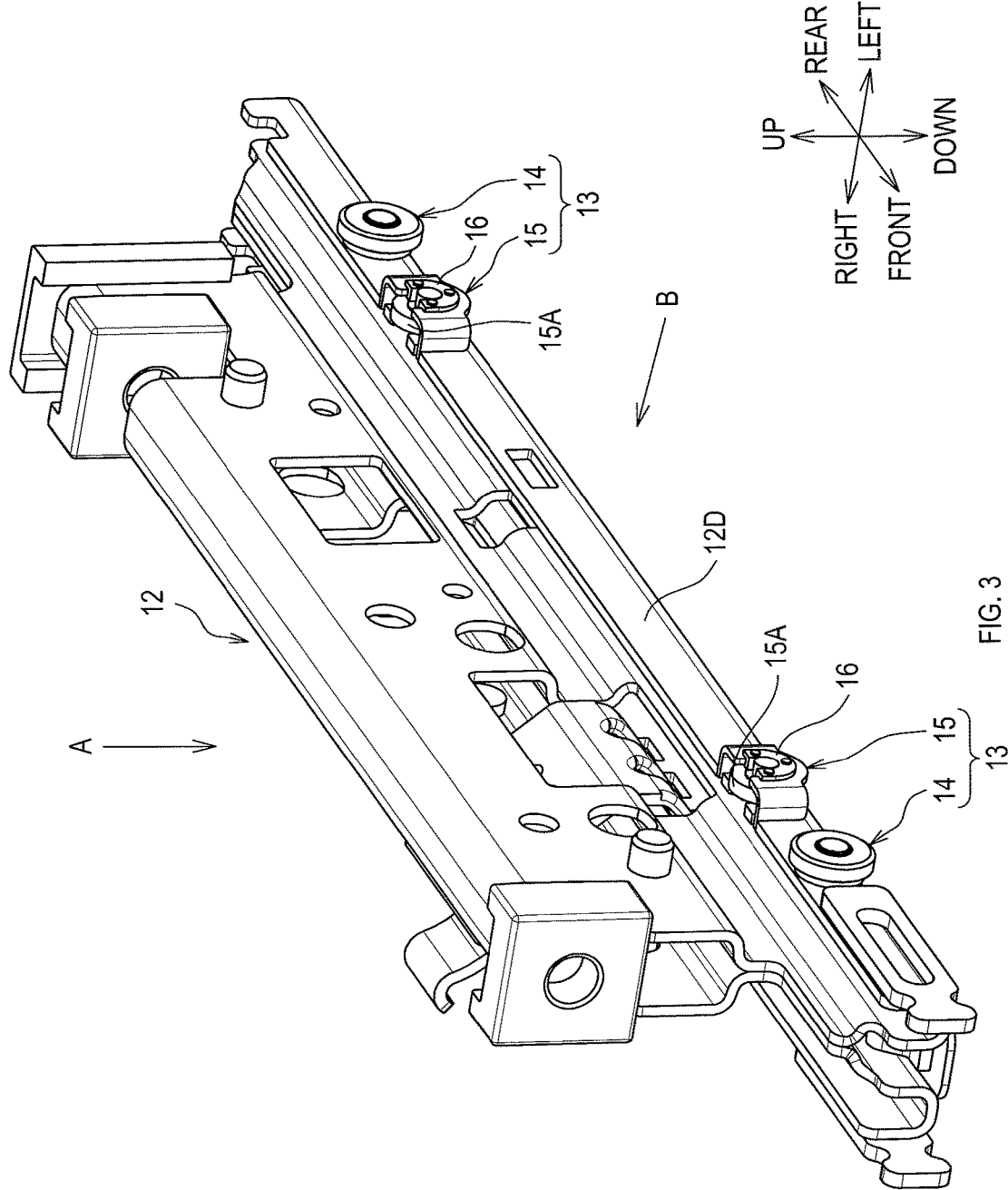
FIG. 3 is a perspective view showing a movable rail according to the embodiment.

A slide-support mechanism 13 (see FIG. 3) is a mechanism for receiving a load imposed on the movable rail 12 and smoothly displacing the movable rail 12 by sliding relative to the fixed rail 11.

The slide-support mechanism 13 comprises at least one first roller rolling element 14, and at least one second roller rolling element 15. As shown in FIGS. 4A and 4B, the movable rail 12 comprises, on its first end in the width direction (in the left side in FIG. 4A), the first roller rolling element 14 and the second roller rolling element 15 respectively on a first end and second end of the movable rail 12 in the direction of extension.

The movable rail 12 comprises, on its second end in the width direction (in the right side in FIG. 4A), the second rolling element 15 on each of the first end and second end of the movable rail 12 in the direction of extension. The first roller rolling element 14 is disposed on the movable rail 12 at an approximately central area in the direction of extension. In other words, one movable rail 12 comprises four second roller rolling elements 15, and three first roller rolling elements 14.

The second roller rolling elements 15 disposed on the first end of the movable rail 12 in the width direction and the second roller rolling elements 15 disposed on the second end of the movable rail 12 in the width direction are identically structured except that their structures are symmetric about the movable rail 12. Similarly, the first roller rolling elements 14 disposed on the first end of the movable rail 12 in the width direction and the first roller rolling element 14 disposed on the second end of the movable rail 12 in the width direction are identically structured except that their structures are symmetric about the movable rail 12.

As shown in FIGS. 4A and 4B, the movable rail 12 comprises, on a left side going from rear to front: a (left rear) first roller element 14, a (left rear) second roller rolling element 15, a (left front) second roller rolling element 15, and a (left front) first roller rolling element 14. Moveable rail 12 also comprises, on a right side going from rear to front: a (right rear) second roller rolling element 15, a (right center) first roller rolling element 14, and a right front) second roller rolling element 15.

The second roller rolling elements 15 on the left side are substantially symmetric with the second roller rolling elements on the right side of movable rail 12.

In total, the embodiment of FIG. 4A illustrates three first roller rolling elements 14 and four second roller rolling elements 15.

1.3 First Roller Rolling Element

The first roller rolling element 14 is one example of a first roller. As shown in FIG. 5, the first roller rolling element 14 comprises a first outer ring 14A, which is in a circular shape, and a first shaft 14B. The first outer ring 14A is rotatably attached to the movable rail 12 via the first shaft 14B.

The first outer ring 14A, that is, the first roller rolling element 14 is configured so as to be able to roll to contact the first rail-surface 11A when receiving a downward load imposed on the movable rail 12. The first outer ring 14A in the present embodiment is made of metal.

The first shaft 14B configures a bearing that has a sliding-contact with an inner circumferential surface of the first outer ring 14A to rotatably support the first outer ring 14A. The first shaft 14B is fixed to the movable rail 12 by joining fixation such as welding, or by mechanical fastening such as swaging.

1.4 Second Roller Rolling Element

Figure 6A:
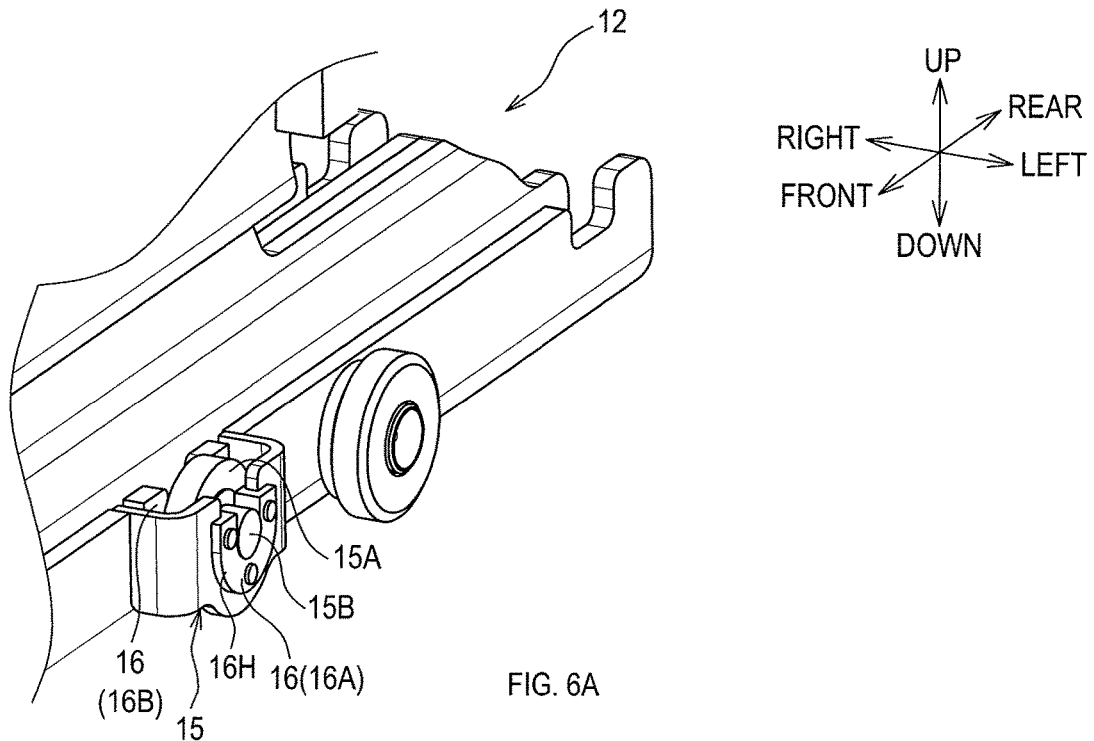
FIG. 6A is a perspective view of a second roller rolling element according to the embodiment.
Figure 6B:
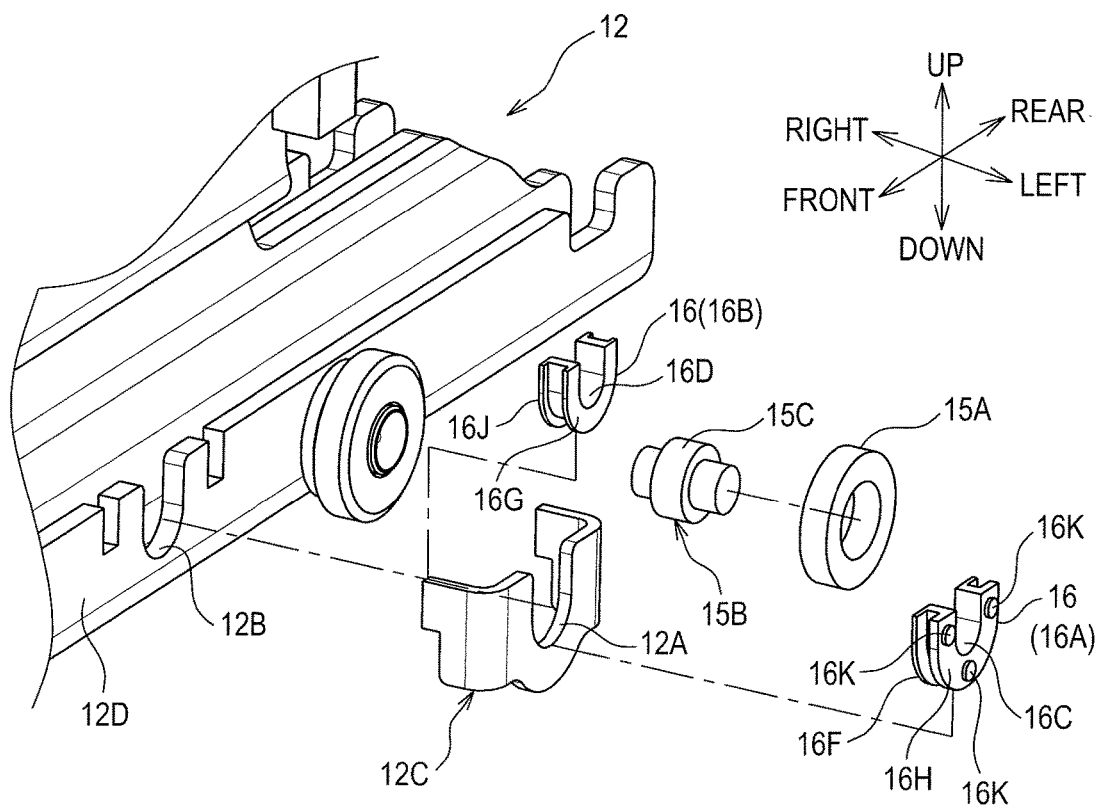
FIG. 6B is an exploded perspective view of the second roller rolling element according to the embodiment.

The second roller rolling element 15 is an example of a second roller. As illustrated in FIGS. 6A and 6B, the second roller rolling element 15 has an annular-shaped second outer ring 15A and a second shaft 15B.

The second outer ring 15A, i.e. the second roller rolling element 15, is configured to roll and contact with the second rail-surface 11B. The second outer ring 15A is rotatably mounted on the movable rail 12 via the second shaft 15B and a pressing member set 16. The pressing member set 16 comprises a first pressing member 16A and a second pressing member 16B. According to the present embodiment, the term "pressing member set 16" is a broad term that refers to two kinds of pressing members: the first pressing member 16A, and the second pressing member 16B.

The second shaft 15B penetrates through the second outer ring 15A and supports the second outer ring 15A so that the second outer ring 15A is rotatable. The pressing member set 16 exerts a pressing force to press the second shaft 15B, i.e. the second roller rolling element 15, on the second rail-surface 11B.

Figure 8:
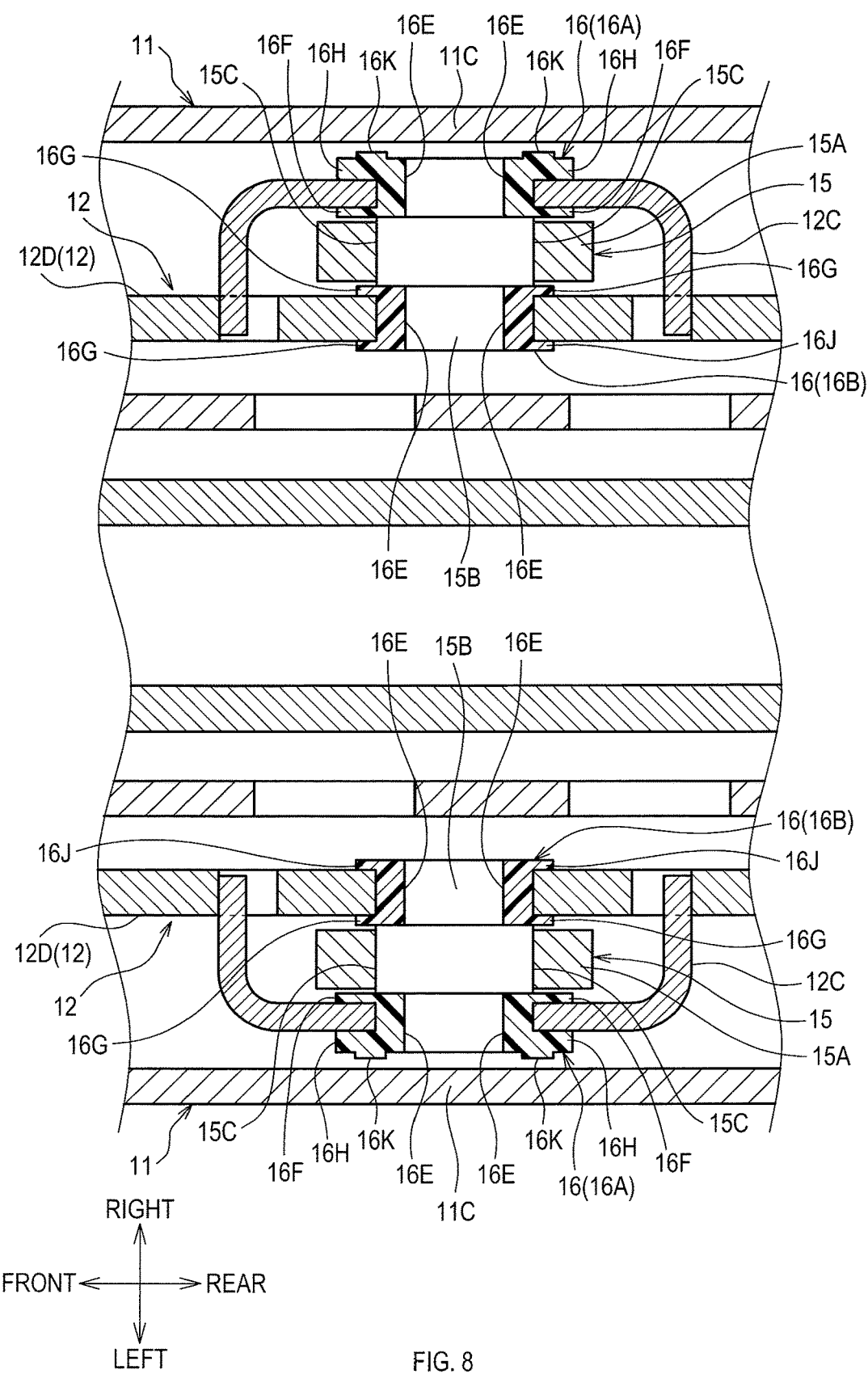
FIG. 8 is a sectional view taken along line VIII-VIII in FIG. 7.

The pressing member set 16 is an elastic body which exerts the pressing force by its elastic deformation. The elastic body includes, for example, resin, rubber, and so on. As illustrated in FIG. 8, the pressing member set 16 applies the pressing force to the second shaft 15B while retaining the second outer ring 15A and support the second shaft 15B from both sides.

The first pressing member 16A is arranged at a first side. The first pressing member 16A supports the second shaft 15B so that the second shaft 15B is rotatable.

The second pressing member 16B is arranged at a second side that is opposite to the first side. The second pressing member 16B supports the second shaft 15B so that the second shaft 15B is rotatable. According to the present embodiment, the first pressing member 16A and the second pressing member 16B are made of the same material. Hereinafter, when the first pressing member 16A and the second pressing member 16B are collectively described, the term "pressing member set 16" may be used.

As illustrated in FIG. 6B, the movable rail 12 is provided with a first concave 12A in which the first pressing member 16A is fitted and a second concave 12B in which the second pressing member 16B is fitted. The first pressing member 16A and the second pressing member 16B are each formed in an approximately U-shape. The first pressing member 16A includes a small concave portion 16C in which the second shaft 15B is fitted. The second pressing member 16B includes a small concave portion 16D in which the second shaft 15B is fitted.

The first concave portion 12A of the present embodiment is provided at a bracket 12C integrated with a movable rail main body 12D. The bracket 12C can be made of metal or resin, but the bracket 12C of the present embodiment is made of metal. The bracket 12C is integrated with the movable rail main body 12D by way of welding, etc.

Figure 7:
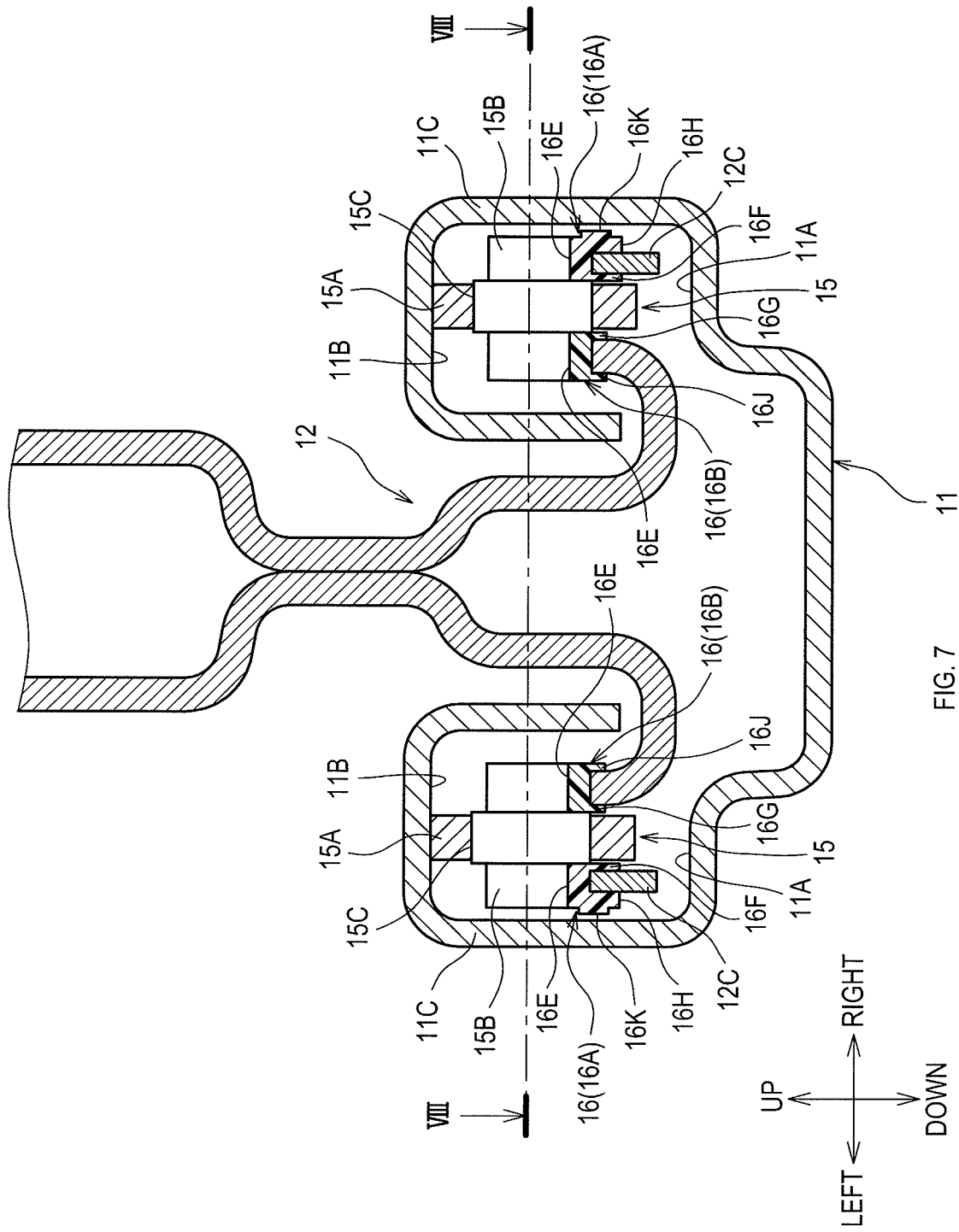
FIG. 7 is a sectional view showing the movable rail according to the embodiment.

As illustrated in FIG. 7, the second roller rolling element 15, i.e. the second outer ring 15A, is rotated due to an occurrence of sliding contact at a contact surface 15C between the second outer ring 15A and the second shaft 15B. In other words, the second shaft 15B configures a bearing which supports the second outer ring 15A while slidably contacting an inner circumferential surface of the second outer ring 15A, so that the second outer ring 15A is rotatable.

In other words, frictional forces generated at contact surfaces 16E between the first pressing member 16A and the second shaft 15B and between the second pressing member 16B and the second shaft 15B are each greater than the frictional force generated at the contact surface 15C between the second outer ring 15A and the second shaft 15. The second outer ring 15A of the present embodiment is made of metal. The second shaft 15B of the present embodiment is made of resin.

As illustrated in FIG. 7, the second roller rolling element 15 rotates on second shaft 15B as second outer right 15A rolls along (and helps to vertically support) second rail surface 11B.

Contact surfaces 16E (corresponding to small concave portions 16D and 16C in FIG. 6B) slidably support the opposite ends of second shaft 15B, so that second outer ring 15A spins relatively freely (relative to the second shaft 15B) while being pressed upward against second rail surface 11B by first pressing member 16A (mounted in first concave portion 12A on bracket 12C) and second pressing member 16B (mounted in second concave portion 12B on movable rail main body 12D). Friction between a top portion of second outer ring 15A and the second rail surface 11B causes second rolling roller element 15 to rotate when the movable rail 12 moves along the fixed rail 11.

Figure 9:
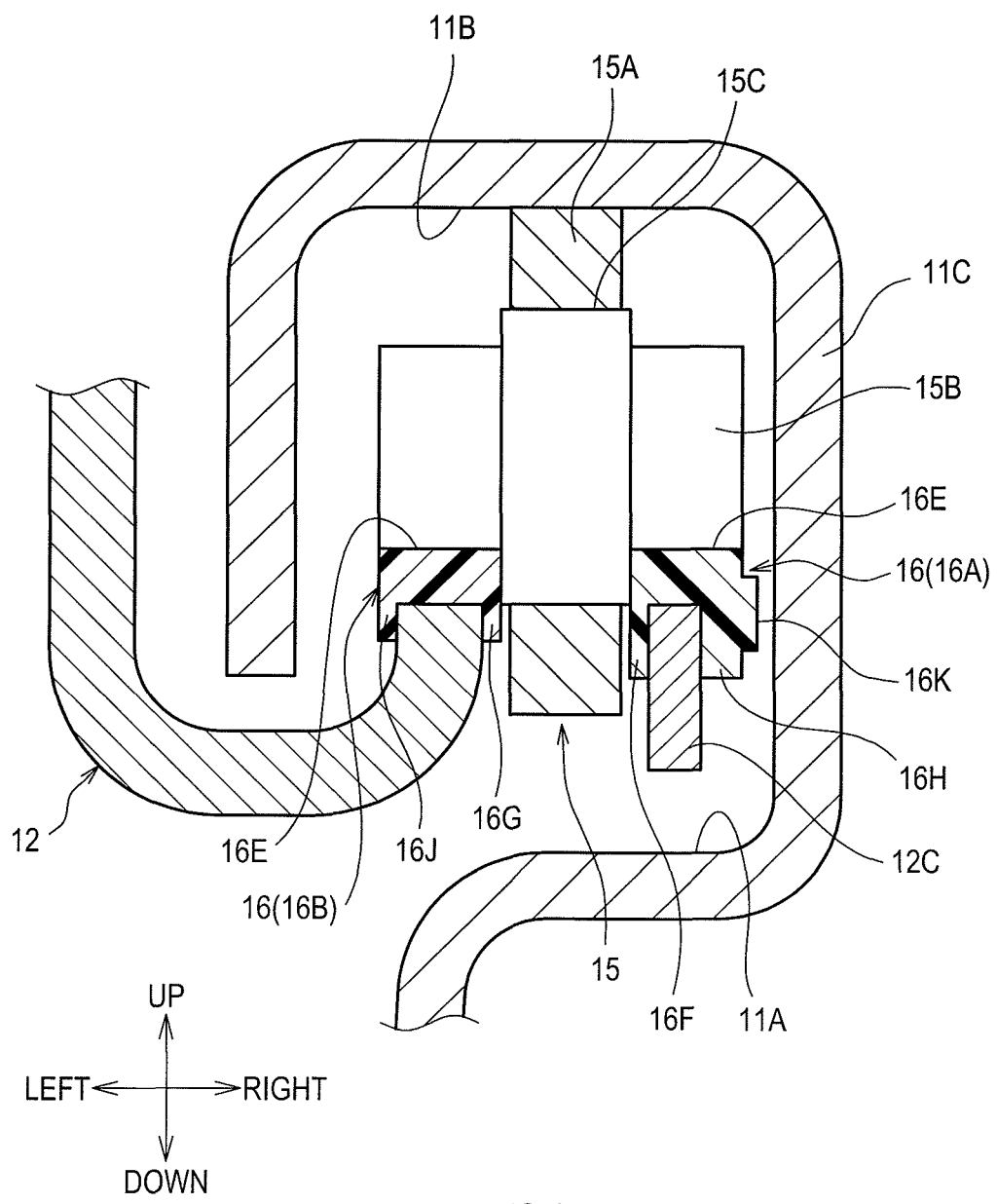
FIG. 9 is an enlarged view of the second roller rolling element according to the embodiment.

As illustrated in FIG. 9, the first pressing member 16A and the second pressing member 16B are provided with a restriction portion 16F and a restriction portion 16G, respectively. The restriction portions 16F and 16G restrict the second outer ring 15A from deviating in an axial direction relative to the second shaft 15B.

That is, the restriction portions 16F and 16G are flange portions which are provided at the sides of the second outer ring 15A of the first pressing member 16A and the second pressing member 16B, respectively, so as to face the side surfaces of the second outer ring 15A. Therefore, when the second outer ring 15A is displaced in the transverse direction (along an axis of second shaft 15B), the second outer ring 15A slide-contacts with either the restriction portion 16F or the restriction portion 16G. Accordingly, the transverse displacement of the second outer ring 15A is restricted without causing very much friction.

In addition, the first pressing member 16A is provided with a flange 16H at a side of the first pressing member 16A, a side which is opposite to the surface facing the second outer ring 15A. The second pressing member 16B is provided with a flange 16J at a side of the second pressing member 16B, a side which is opposite to the surface facing the second outer ring 15A. The flanges 16H and 16J support the movable rail 12 and the bracket 12C from both sides in a plate thickness direction cooperatively with the restriction portions 16F and 16G.

Therefore, the respective pressing members 16 are inhibited from being removed from the movable rail 12 and the bracket 12C. The flange 16H and the restriction portion 16F are integrally formed using resin, and the flange 16J and the restriction portion 16G are integrally formed using resin.

The connecting portion 11C faces the first pressing member 16A. As illustrated in FIG. 6B, the first pressing member 16A is provided with a plurality of protrusions 16K at the side facing the confronting surface of the connecting portion 11C. The protrusions 16K protrude towards the confronting surface of the connecting portion 11C. The second pressing member 16B of the present embodiment is preferably not provided with portions corresponding to the protrusions 16K.

2. Features of the Seat Sliding Device of the Present Embodiment

According to the embodiment, the second outer ring 15A is pressed against the second rail-surface 11B by the pressing member set 16 configured separately from the movable rail 12. Therefore, even when there is large variation in dimensions of the movable rail 12 (especially of the movable rail main body 12D), the dimensional variation is absorbed by an elastic deformation of the pressing member set 16.

Accordingly, it is possible to inhibit large variations in pressure contact force between the second outer ring 15A and the second rail-surface 11. As a result, it is possible to inhibit the looseness of the seat sliding device 10. Here, the "elastic deformation" encompasses not only the deformation within the elastic range of the pressing member set 16 but also permanent distortion (plastic deformation) occurred when no load is applied to the pressing member set 16.

The respective pressing members of the pressing member set 16, i.e. the first pressing member 16A and the second pressing member 16B, apply upward pressing forces to the second shaft 15B while preventing the second shaft 15B from displacing transversly. Accordingly, the pressing member set 16 can suitably support the second outer ring 15A.

The second outer ring 15A is configured to rotate by the sliding contact occurred between the second outer ring 15A and the second shaft 15. Accordingly, it is possible to inhibit the pressing member set 16 from abrasion and to inhibit the pressing force of the pressing member set 16 from reducing.

The second outer ring 15A and the second shaft 15B are preferably made of metal. Accordingly, it is possible to inhibit abrasion of the second outer ring 15A.

The first pressing member 16A is provided with the restriction portion 16F which restricts the second outer ring 15A from deviating in the axial direction relative to the second shaft 15B. The second pressing member 16B is provided with the restriction portion 16G which works similar to the restriction portion 16F. Accordingly, it is possible to inhibit occurrences of failures, for example, that the second outer ring 15A comes off the second shaft 15B.

The first pressing member 16A is provided with the multiple protrusions 16K at its side facing the confronting surface of the connecting portion 11C. The protrusions 16K protrude towards the confronting surface. Accordingly, the multiple protrusions 16K abut on and slidably contact the confronting surface, thereby enabling to inhibit excessive displacement of the movable rail 12 in the width direction.

Other Embodiments

The pressing member set 16 of the above-described embodiment may be made of metal such as spring steel material, for example.

According to the above-described embodiment, for example, the second outer ring 15A may be made of resin such as rubber and function as a pressing member. In this case, the pressing member set 16 may be omitted.

The second shaft 15B of the above-described embodiment is configured to be supported at both sides by the pressing member set 16 retaining the second outer ring 15A. However, the second shaft 15B may be configured to be supported at one side by a single pressing member.

According to the above-described embodiment, for example, the contact surface between the second shaft 15B and the pressing member set 16 may be configured to slidably contact.

According to the above-described embodiment, for example, the first pressing member 16A may not have the protrusions 16K at its side facing the confronting surface of the connecting portion 11C. Further, the connecting portion 11C may be configured to have at least one protrusion protruding towards the first pressing member 16A.

According to the above-described embodiment, for example, the bracket 12C may be formed integrally with the movable rail main body 12D, and the bracket 12C may configure a part of the movable rail 12.

According to the above-described embodiment, the seat sliding device 10 is applied to seats for standard passenger cars. However, the seat sliding device 10 can be applied to seats for other automobiles or for vehicles such as railway vehicles, ships, airplanes, and so on, or to non-vehicle seats such as theater seats.

The present disclosure is not limited to the aforementioned embodiments as long as it falls within the spirit of the invention described in the claims.

What is claimed is:
1. A seat sliding device comprising:
a fixed rail that comprises a first rail-surface facing upward and a second rail-surface facing downward;
a movable rail that is configured to be slidable relative to the fixed rail and to support a seat;
at least one first roller that is mounted on the movable rail, wherein the at least one first roller is configured to receive a downward load imposed on the movable rail and to roll on the first rail-surface;
at least one second roller that is mounted on the movable rail and is configured to roll on the second rail-surface; and
at least one pressing member configured to elastically deform and to upwardly press the at least one second roller upwardly against the second rail-surface.

2. The seat sliding device according to claim 1,
wherein the at least one second roller comprises: an annular-shaped outer ring that rolls on the second rail-surface; and a shaft that penetrates the outer ring, and
wherein the at least one pressing member applies a pressing force to the shaft while supporting the shaft at both sides.

3. The seat sliding device according to claim 2, wherein the at least one second roller is configured to rotate by a sliding contact occurred at a contact surface between the outer ring and the shaft.

4. The seat sliding device according to claim 3, wherein a frictional force occurred at a contact surface between each of the at least one pressing member and the shaft is greater than a frictional force occurred at the contact surface between the outer ring and the shaft.

5. The seat sliding device according to claim 2, wherein the outer ring and the shaft are made of metal.

6. The seat sliding device according to claim 2, wherein the at least one pressing member comprises a restriction portion that restricts the outer ring from deviating in an axial direction relative to the shaft.

7. The seat sliding device according to claim 2,
wherein the at least one pressing member comprises:
a first pressing member that transversely restricts the outer ring and is arranged at a first side; and
a second pressing member that further restricts the outer ring and is arranged at a second side opposed to the first side,
wherein the movable rail comprises:
at least one first concave portion in which the first pressing member is fitted; and
at least one second concave portion in which the second pressing member is fitted, and
wherein the first pressing member comprises a first approximately U-shaped small concave portion in which a first end of the shaft is fitted and
wherein the second pressing member comprises a second approximately U-shaped small concave portion in which a second end of the shaft is fitted.

8. The seat sliding device according to claim 7, wherein the fixed rail comprises a confronting surface approximately perpendicular to a horizontal direction at a position of the fixed rail facing the first pressing member, and the first pressing member is provided with at least one protrusion protruding toward the confronting surface at the side of the first pressing member facing the confronting surface.

* * * * *